(12) United States Patent
Nilsson

(10) Patent No.: US 10,778,304 B2
(45) Date of Patent: Sep. 15, 2020

(54) POLARIZATION HANDLING OF BEAM-FORMED SIGNALS

(71) Applicant: Telefonaktiebolaget LM Ericsson (publ), Stockholm (SE)

(72) Inventor: Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 514 days.

(21) Appl. No.: 15/505,952

(22) PCT Filed: Feb. 8, 2017

(86) PCT No.: PCT/EP2017/052712
§ 371 (c)(1),
(2) Date: Feb. 23, 2017

(87) PCT Pub. No.: WO2018/145737
PCT Pub. Date: Aug. 16, 2018

(65) Prior Publication Data
US 2019/0097703 A1 Mar. 28, 2019

(51) Int. Cl.
*H04B 7/06* (2006.01)
*H04B 7/10* (2017.01)

(52) U.S. Cl.
CPC ............ *H04B 7/0617* (2013.01); *H04B 7/10* (2013.01)

(58) Field of Classification Search
CPC ................................ H04B 7/0617; H04B 7/10
USPC .................... 375/260, 267; 343/725
See application file for complete search history.

(56) References Cited

U.S. PATENT DOCUMENTS

| 6,519,478 | B1* | 2/2003 | Scherzer | H01Q 1/246 343/725 |
| 9,214,981 | B1 | 12/2015 | Park et al. | |
| 2012/0052828 | A1 | 3/2012 | Kamel et al. | |
| 2016/0080051 | A1* | 3/2016 | Sajadieh | H04B 7/0456 375/267 |

OTHER PUBLICATIONS

Tateishi, Kiichi et al., "Indoor Experiment on 5G Radio Access Using Beam Tracking at 15 GHZ Band in Small Cell Environment," 2016 IEEE 27th Annual International Symposium on Personal, Indoor, and Mobile Radio Communications (PIMRC), Sep. 2016, 6 pages.
International Search Report and Written Opinion issued in International Application No. PCT/EP2017/052712, dated Oct. 12, 2017, 12 pages.

* cited by examiner

*Primary Examiner* — Fitwi Y Hailegiorgis
(74) *Attorney, Agent, or Firm* — Rothwell, Figg, Ernst & Manbeck, P.C.

(57) ABSTRACT

There is provided mechanisms for polarization handling of received beam-formed signals. A method is performed by a receiving radio transceiver device. The method comprises collecting statistics of received power of a beam-formed signal transmitted in two orthogonal polarizations from a transmitting radio transceiver device. The method comprises determining a similarity measure value of the beam-formed signal between the two orthogonal polarizations using the collected statistics. The method comprises signalling to the transmitting radio transceiver device, when the similarity measure value is equal to, or larger than, a similarity threshold value, to use rank one for subsequent transmission of the beam-formed signal to the receiving radio transceiver device.

17 Claims, 6 Drawing Sheets

POLARIZATION HANDLING OF BEAM-FORMED SIGNALS

CROSS REFERENCE TO RELATED APPLICATION(S)

This application is a 35 U.S.C. § 371 National Stage of International Patent Application No. PCT/EP2017/052712, filed Feb. 8, 2017, designating the United States, the disclosure of which is incorporated by reference.

TECHNICAL FIELD

Embodiments presented herein relate to methods, radio transceiver devices, computer programs, and a computer program product for polarization handling of beam-formed signals.

BACKGROUND

In communications systems, there may be a challenge to obtain good performance and capacity for a given communications protocol, its parameters and the physical environment in which the communications system is deployed.

For example, for future generations of mobile communications systems frequency bands at many different carrier frequencies could be needed. For example, low such frequency bands could be needed to achieve sufficient network coverage for users (e.g. wireless devices) and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network-side (e.g. at transmission points or access nodes) and at the user-side might be required to reach a sufficient link budget.

In mobile communications systems having a beam centric design, users may be operatively connected to the network by, and perform handover between, narrow beams instead of cells. At high frequencies, where high-gain beamforming will be needed due to more challenging radio channel propagation properties, each such narrow beam will only be optimal within a small area covered by the narrow area and the link budget for a user using the narrow beam but being located outside the small area will deteriorate quickly. Hence, a frequent and fast beam switching method is needed to maintain high performance, so called beam management.

The purpose of beam management is to keep track of users communicating with the network using narrow beams in order to increase the network coverage and throughput. Due to rotation, movement and blockage of the users, the beam (at the network-side and/or at the user-side) needs to be updated dynamically in order to maintain good channel quality between the network and the user. In case a user loses beam connection with the network, for example due to blockage, a beam recovery procedure can be initiated to re-establish the beam connection. Such beam recovery procedure can for example involve all beam combinations of the beams used at the user-side and the beams used at the network-side to be swept through in order for the best combination to be selected. When there are many candidate beams at both the network-side and the user-side, such a beam sweeping procedure (also referred to as beam training procedure) can be very costly in terms of time consumption and overhead signaling.

Hence, there is still a need for mechanisms enabling the beam sweeping procedure to be improved.

SUMMARY

An object of embodiments herein is to provide mechanisms that enable efficient beam sweeping handling in a beam sweeping procedure.

According to a first aspect there is presented a method for polarization handling of received beam-formed signals. The method is performed by a receiving radio transceiver device. The method comprises collecting statistics of received power of a beam-formed signal transmitted in two orthogonal polarizations from a transmitting radio transceiver device. The method comprises determining a similarity measure value of the beam-formed signal between the two orthogonal polarizations using the collected statistics. The method comprises signalling to the transmitting radio transceiver device, when the similarity measure value is equal to, or larger than, a similarity threshold value, to use rank one for subsequent transmission of the beam-formed signal to the receiving radio transceiver device.

According to a second aspect there is presented a radio transceiver device acting as a receiving radio transceiver device for polarization handling of received beam-formed signals. The radio transceiver device comprises processing circuitry. The processing circuitry is configured to cause the radio transceiver device to collect statistics of received power of a beam-formed signal transmitted in two orthogonal polarizations from a transmitting radio transceiver device. The processing circuitry is configured to cause the radio transceiver device to determine a similarity measure value of the beam-formed signal between the two orthogonal polarizations using the collected statistics. The processing circuitry is configured to cause the radio transceiver device to signal to the transmitting radio transceiver device, when the similarity measure value is equal to, or larger than, a similarity threshold value, to use rank one for subsequent transmission of the beam-formed signal to the receiving radio transceiver device.

According to a third aspect there is presented a radio transceiver device acting as a receiving radio transceiver device for polarization handling of received beam-formed signals. The radio transceiver device comprises processing circuitry and a storage medium. The storage medium stores instructions that, when executed by the processing circuitry, cause the radio transceiver device to perform operations, or steps. The operations, or steps, cause the radio transceiver device to collect statistics of received power of a beam-formed signal transmitted in two orthogonal polarizations from a transmitting radio transceiver device. The operations, or steps, cause the radio transceiver device to determine a similarity measure value of the beam-formed signal between the two orthogonal polarizations using the collected statistics. The operations, or steps, cause the radio transceiver device to signal to the transmitting radio transceiver device, when the similarity measure value is equal to, or larger than, a similarity threshold value, to use rank one for subsequent transmission of the beam-formed signal to the receiving radio transceiver device.

According to a fourth aspect there is presented a radio transceiver device acting as a receiving radio transceiver device for polarization handling of received beam-formed signals. The radio transceiver device comprises a collect module configured to collect statistics of received power of a beam-formed signal transmitted in two orthogonal polarizations from a transmitting radio transceiver device. The radio transceiver device comprises a determine module configured to determine a similarity measure value of the beam-formed signal between the two orthogonal polarizations using the collected statistics. The radio transceiver device comprises a signal module configured to signal to the transmitting radio transceiver device, when the similarity measure value is equal to, or larger than, a similarity threshold value, to use rank one for subsequent transmission of the beam-formed signal to the receiving radio transceiver device.

According to a fifth aspect there is presented a computer program for polarization handling of received beam-formed signals, the computer program comprises computer program code which, when run on processing circuitry of a radio transceiver device acting as a receiving radio transceiver device, causes the radio transceiver device to perform a method according to the first aspect.

According to a sixth aspect there is presented a method for polarization handling of transmitted beam-formed signals. The method is performed by a transmitting radio transceiver device. The method comprises transmitting a beam-formed signal in two orthogonal polarizations. The method comprises receiving signalling from a receiving radio transceiver device, the signalling indicating for the transmitting radio transceiver device to use rank one for subsequent transmission of the beam-formed signal to the receiving radio transceiver device.

According to a seventh aspect there is presented a radio transceiver device acting as a transmitting radio transceiver device for polarization handling of transmitted beam-formed signals. The radio transceiver device comprises processing circuitry. The processing circuitry is configured to cause the radio transceiver device to transmit a beam-formed signal in two orthogonal polarizations. The processing circuitry is configured to cause the radio transceiver device to receive signalling from a receiving radio transceiver device, the signalling indicating for the transmitting radio transceiver device to use rank one for subsequent transmission of the beam-formed signal to the receiving radio transceiver device.

According to an eighth aspect there is presented a radio transceiver device acting as a transmitting radio transceiver device for polarization handling of transmitted beam-formed signals. The radio transceiver device comprises processing circuitry and a storage medium. The storage medium stores instructions that, when executed by the processing circuitry, cause the radio transceiver device to perform operations, or steps. The operations, or steps, cause the radio transceiver device to transmit a beam-formed signal in two orthogonal polarizations. The operations, or steps, cause the radio transceiver device receive signalling from a receiving radio transceiver device, the signalling indicating for the transmitting radio transceiver device to use rank one for subsequent transmission of the beam-formed signal to the receiving radio transceiver device.

According to a ninth aspect there is presented a radio transceiver device acting as a transmitting radio transceiver device for polarization handling of transmitted beam-formed signals. The radio transceiver device comprises a transmit module configured to transmit a beam-formed signal in two orthogonal polarizations. The radio transceiver device comprises a receive module configured to receive signalling from a receiving radio transceiver device, the signalling indicating for the transmitting radio transceiver device to use rank one for subsequent transmission of the beam-formed signal to the receiving radio transceiver device.

According to a tenth aspect there is presented a computer program for polarization handling of transmitted beam-formed signals, the computer program comprising computer program code which, when run on processing circuitry of a radio transceiver device acting as a transmitting radio transceiver device, causes the radio transceiver device to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these radio transceiver devices, and these computer programs can be used to streamline a beam sweeping procedure.

Advantageously these methods, these radio transceiver devices, and these computer programs allow the receiving radio transceiver device to quicker perform a beam training procedures in some scenario where rank one beam sweeping is sufficient.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers refer to like elements throughout the description. Any step or feature illustrated by dashed lines should be regarded as optional.

Figure 1:
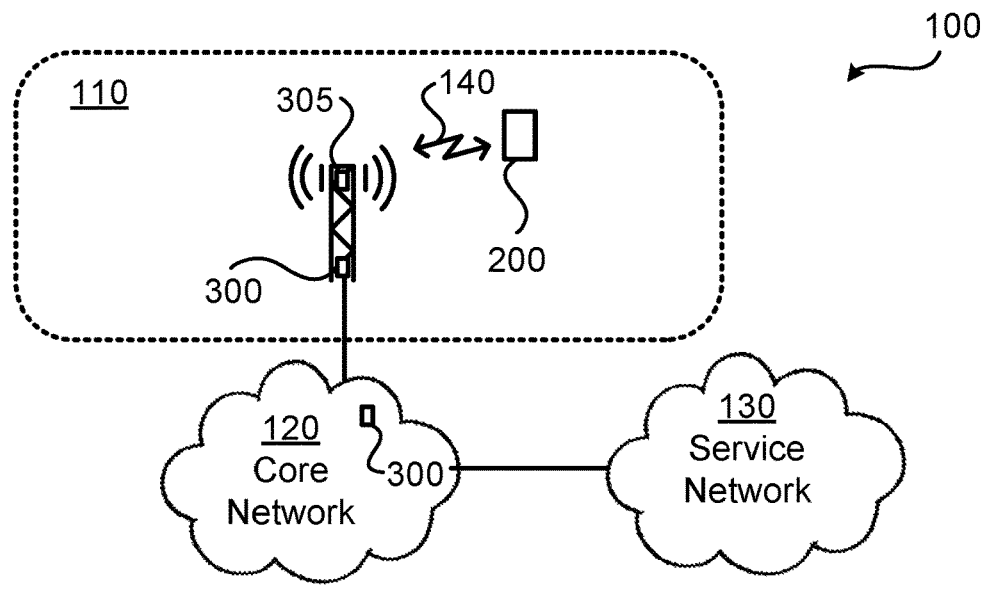
FIG. 1 is a schematic diagram illustrating a communications system according to embodiments.

FIG. 1 is a schematic diagram illustrating a communications system 100 where embodiments presented herein can be applied. The communications system 100 comprises at least one radio transceiver device 300 acting as a transmitting radio transceiver device 300. The transmitting radio transceiver device 300 is operatively connected to a transmission and reception point (TRP) 305 for transmission and receptions of signals 140. Further functionality of the transmitting radio transceiver device 300 and how it interacts with other entities, nodes, and devices in the communications system 100 will be further disclosed below.

The transmitting radio transceiver device 300 could either be part of a radio access network no and be operatively connected to a core network 120 or be part of the core network 120. The core network 120 is in turn operatively connected to a service network 130. The transmitting radio transceiver device 300 provides network access in the radio access network no by transmitting and receiving signals 140. A radio transceiver device 200 acting as a receiving radio transceiver device served by the transmitting radio transceiver device 300 is thereby enabled to access services and exchange data with the core network 120 and the service network 130.

For ease of notation, the radio transceiver device 200 will hereinafter be referred to as a receiving radio transceiver device 200 and the radio transceiver device 300 will hereinafter be referred to as a transmitting radio transceiver device 300. However, as the skilled person understands, the radio transceiver device 200 may selectively acts as either a receiving radio transceiver device or a transmitting radio transceiver device, and the radio transceiver device 300 may selectively acts as either a transmitting radio transceiver device or a receiving radio transceiver device.

Figure 2:
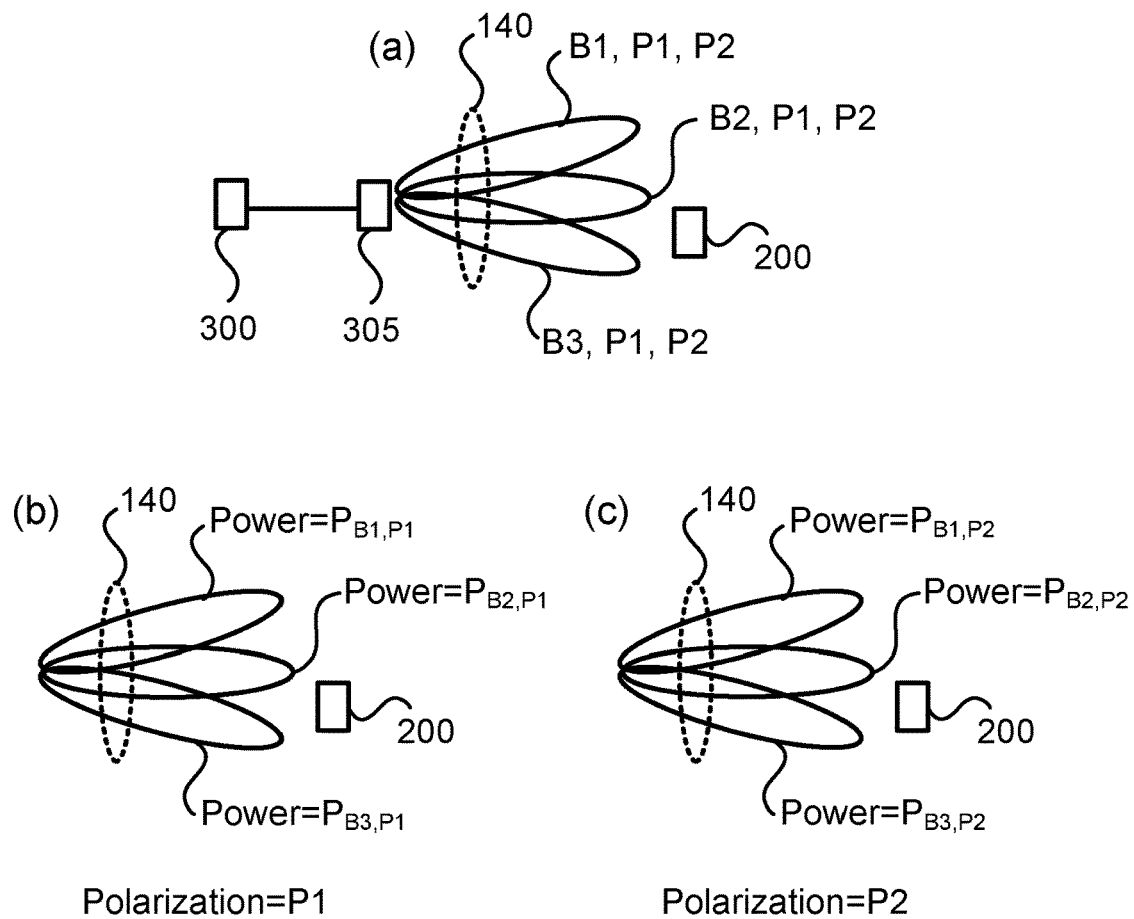
FIG. 2 is a schematic illustration of part of the communications system in FIG. 1 according to embodiments.

FIG. 2(a) schematically illustrates part of the communications system 100 of FIG. 1. In more detail, FIG. 2(a) schematically illustrates a transmitting radio transceiver device 300 that, via the TRP 305, transmits a beam-formed signal 140 to a receiving radio transceiver device 200. The beam-formed signal 140 is transmitted in beams B1, B2, B3. As the skilled person understands, although only three beams B1, B2, B3 are illustrated, the beam-formed signal 140 could be transmitted in a plurality of beams. The beam-formed signal 140 is in each beam B1, B2, B3 transmitted using two orthogonal polarizations P1, P2.

As illustrated in FIGS. 2(b) and 2(c) the received power at the receiving radio transceiver device 200 of beam Bx, where x={1, 2, 3}, using polarization Py, where y={1, 2} is denoted $P_{Bx,Py}$. The transmitting radio transceiver device 300 and/or the receiving radio transceiver device 200, for example during a beam training procedure, sweeps through each beam B1, B2, B3 for each polarization P1, P2.

The transmitting radio transceiver device 300 and/or the receiving radio transceiver device 200 could implement beamforming by means of analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different wireless devices, different implementations will be needed.

Different antenna architectures for different frequency bands are being discussed for wireless devices. At high frequency bands (e.g. above 15 GHz) something called "panels" of antenna arrays are being discussed. These panels of antenna array may be uniform linear/rectangular arrays (ULAs/URAs), for example steered by using analog phase shifters. A panels is an antenna array with (typically) one transmit/receive radio chain per polarization and where an analog distribution network with phase shifters is used to steer the beam of each panel. Multiple panels can be stacked next to each other and digital beamforming can be used to generate beams also between the panels. At high frequencies panels are expected to be used both at the network-side and at the user-side.

Panels typically have two polarizations with one radio per polarization per panel. Hence, when performing beam sweeping procedures, either each beam is transmitted (and received) in one polarization (so-called rank one beam sweeping) or each beam is transmitted (and received) in two orthogonal polarizations (so-called rank two beam sweeping). One potential drawback with rank one beam sweeping is that it is less reliable due to that different polarizations experience different channels, so the beast beam for one polarization might not be the best beam for the other polarization. One benefit with rank one beam sweeping is that it only requires half the overhead compared to rank two beam sweeping, and hence can be performed twice as quick. Thus, for some scenarios it could be unnecessary for the receiving radio transceiver device 200 to sweep through all beams B1, B2, B3 using both polarizations P1, P2.

The embodiments disclosed herein thus relate to mechanisms for polarization handling of received beam-formed signals 140 and polarization handling of transmitted beam-formed signals 140. In order to obtain such mechanisms there is provided a receiving radio transceiver device 200, a method performed by the receiving radio transceiver device 200, a computer program product comprising code, for example in the form of a computer program, that when run on processing circuitry of the receiving radio transceiver device 200, causes the receiving radio transceiver device 200 to perform the method. In order to obtain such mechanisms there is further provided a transmitting radio transceiver device 300, a method performed by the transmitting radio transceiver device 300, and a computer program product comprising code, for example in the form of a computer program, that when run on processing circuitry of the transmitting radio transceiver device 300, causes the transmitting radio transceiver device 300 to perform the method.

Figure 3:
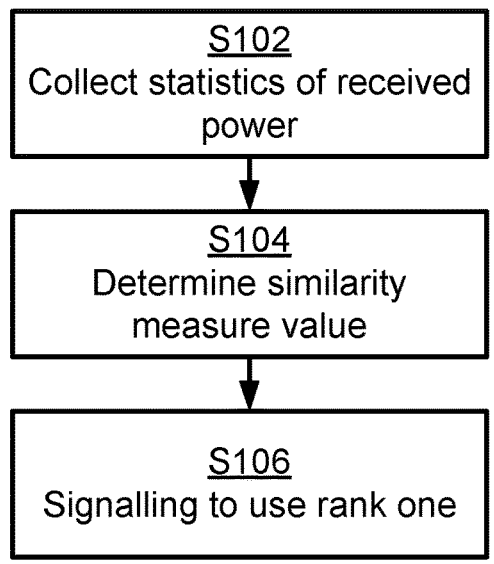
FIGS. 3, 4, 5, 6, 7, and 8 are flowcharts of methods according to embodiments.
Figure 4:
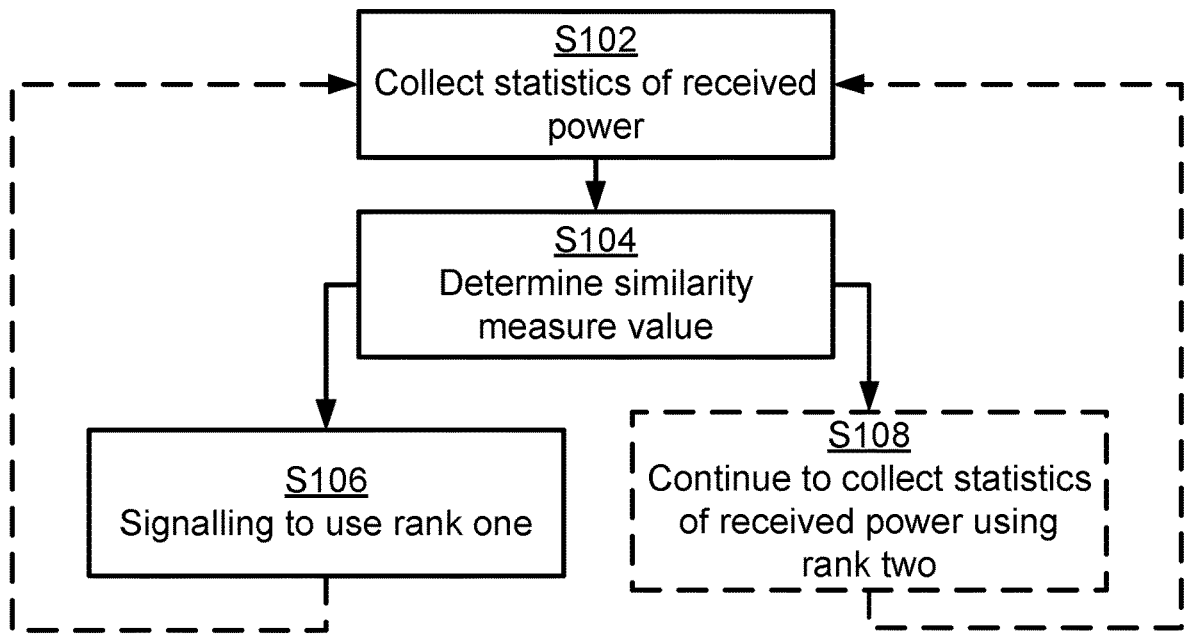
Figure 5:
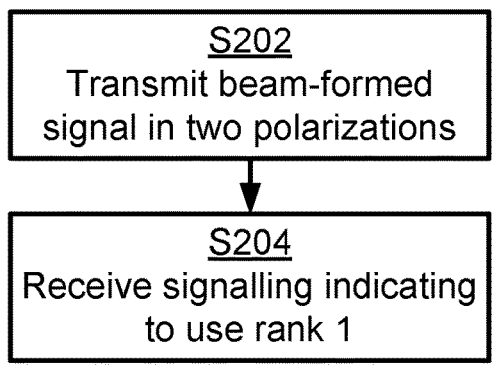
Figure 6:
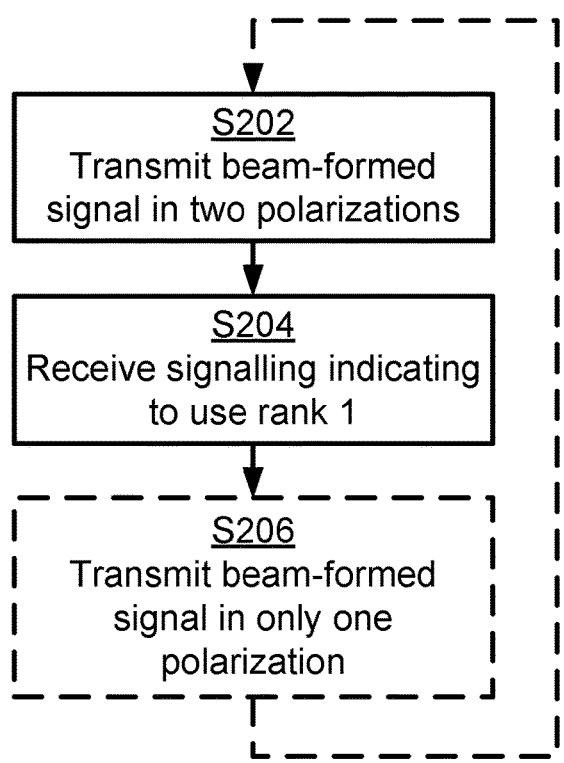

FIGS. 3 and 4 are flow charts illustrating embodiments of methods for polarization handling of received beam-formed signals 140 as performed by the receiving radio transceiver device 200. FIGS. 5 and 6 are flow charts illustrating embodiments of methods for polarization handling of transmitted beam-formed signals 140 as performed by the transmitting radio transceiver device 300. The methods are advantageously provided as computer programs 1320a, 1320b.

Reference is now made to FIG. 3 illustrating a method for polarization handling of received beam-formed signals 140 as performed by the receiving radio transceiver device 200 according to an embodiment.

As will be further disclosed below, the transmitting radio transceiver device 300 transmits a beam-formed signal 140. It is assumed that the beam-formed signal 140 is received by the receiving radio transceiver device 200. Thus, the receiving radio transceiver device 200 is configured to perform step S102:

S102: The receiving radio transceiver device 200 collects statistics of received power of a beam-formed signal 140. The beam-formed signal 140 is transmitted in two orthogonal polarizations P1, P2 from the transmitting radio transceiver device 300. Examples of the beam-formed signal 140 will be disclosed below.

In this respect, the receiving radio transceiver device 200 measures received power of the beam-formed signal 140 as transmitted using rank two (i.e. where the beam-formed signal 140 is transmitted from two orthogonal polarizations P1, P2). It might be so that the receiving radio transceiver device 200 only requires reception of the beam-formed signal 140 in one of the polarizations P1, P2 in order to adequately process the beam-formed signal 140. Hence, the receiving radio transceiver device 200 compares the beam-formed signal 140 received in one of the two orthogonal polarizations P1, P2 to the beam-formed signal 140 received in the other one of the two orthogonal polarizations P1, P2. Particularly, the receiving radio transceiver device 200 is configured to perform step S104:

S104: The receiving radio transceiver device 200 determines a similarity measure value of the beam-formed signal 140 between the two orthogonal polarizations P1, P2 using the collected statistics. Examples of how the similarity measure value can be determined will be disclosed below.

If the similarity measure value is equal to, or larger than, a similarity threshold value then the receiving radio transceiver device 200 needs only to receive the beam-formed signal in one of the polarizations P1, P2. Hence, the receiving radio transceiver device 200 is configured to perform step S106:

S106: The receiving radio transceiver device 200 signals to the transmitting radio transceiver device 300, when the similarity measure value is equal to, or larger than, a similarity threshold value, to use rank one for subsequent transmission of the beam-formed signal 140 to the receiving radio transceiver device 200.

It will below be disclosed how the receiving radio transceiver device 200 could be configured to act when the similarity measure value is smaller than the similarity threshold value.

Embodiments relating to further details of polarization handling of received beam-formed signals 140 as performed by the receiving radio transceiver device 200 will now be disclosed.

As mentioned above, the similarity measure value is equal to, or larger than, a similarity threshold value then the receiving radio transceiver device 200 needs only to receive the beam-formed signal in one of the polarizations P1, P2. Therefore, according to an embodiment, when signalled to use rank one, the transmitting radio transceiver device 300 is in step S106 signalled to only use one of the two orthogonal polarizations P1, P2 for the subsequent transmission of the beam-formed signal 140 to the receiving radio transceiver device 200.

In general terms, if rank one or rank two should be used for the beam-formed signal 140 depends largely on the antenna implementation at the receiving radio transceiver device 200. For example, if the receiving radio transceiver device 200 has dual-polarized receive antennas, it could be that only rank one is needed. Further, in scenarios where there is a line of sight radio propagation channel between the TRP 305 of the transmitting radio transceiver device 300 and the receiving radio transceiver device 200, rank one could be sufficient, as long as the receiving radio transceiver device 200 has dual-polarized antennas.

There could be different ways to set the similarity threshold value. The similarity threshold value could be a pre-configured, or pre-set, value implemented in the receiving radio transceiver device 200. Further, the similarity threshold value could be based on a previous beam training procedure as performed by the receiving radio transceiver device 200. The similarity threshold value could then be set such that the receiving radio transceiver device 200 has a high probability (such that a probability over 0.50, preferably over 0.75, and most preferably over 0.90) of successfully receiving and decoding the beam-formed signal 140 when being transmitted using only rank one. Further, the similarity threshold value could be based on a pre-configured, or pre-set, value that is updated during a beam training procedure.

There could be different ways for the receiving radio transceiver device 200 to determine the similarity measure value in step S104. According to an embodiment the similarity measure value is determined based on a correlation between the beam-formed signal 140 in a first (say, P1) of the two orthogonal polarizations P1, P2 and the beam-formed signal 140 in a second (say, P2) of the two orthogonal polarizations P1, P2. Hence, when the similarity measure value is determined based on a correlation and normalized to take a value in the range [0, 1], the similarity threshold value could represent a normalized correlation value, such that at least 0.5, preferably at least 0.75, and most preferably at least 0.90. That is, if the similarity threshold value is 0.75, rank one would be used only if the normalized correlation between the beam-formed signal 140 in a first (say, P1) of the two orthogonal polarizations P1, P2 and the beam-formed signal 140 in a second (say, P2) of the two orthogonal polarizations P1, P2 is at least 0.75.

As in FIG. 2(a), the beam-formed signal 140 could by the transmitting radio transceiver device 300 be transmitted in at least two beams B1, B2, B3. Hence, according to an embodiment the beam-formed signal 140 for each of the two orthogonal polarizations P1, P2 is in step S102 received in at least two beams B1, B2, B3.

In some aspects the similarity measure is based on a comparison between the polarizations P1, P2 according to the order in which the strongest received power is received for the different beams B1, B2, B3. Hence, according to an embodiment the similarity measure value is determined based on an ordering of the at least two beams B1, B2, B3 according to received power $P_{B1,P1}$, $B_{B2,P1}$, $P_{B3,P1}$, $P_{B1,P2}$, $P_{B2,P2}$, $P_{B3,P2}$ in each of the at least two beams B1, B2, B3 for each of the two orthogonal polarizations P1, P2. As an example the combination $P_{B1,P1} > P_{B3,P1} > P_{B2,P1}$, and $P_{B1,P2} > P_{B3,P2} > P_{B2,P2}$ would indicate a high similarity measure value, whereas the combination $P_{B1,P1} > P_{B2,P1} > P_{B3,P1}$, and $P_{B3,P2} > P_{B2,P2} > P_{B1,P2}$ would indicate a low similarity measure value.

In some aspects the similarity measure is based on a comparison between the polarizations P1, P2 of the beams B1, B2, B3 in which the strongest power is received. Hence, according to an embodiment the similarity measure value is determined based on in which of the at least two beams B1, B2, B3 the received power $P_{B1,P1}$, $P_{B2,P1}$, $P_{B3,P1}$, $P_{B1,P2}$, $P_{B2,P2}$, $P_{B3,P2}$ is strongest for the two orthogonal polarizations P1, P2. As an example the combination $P_{B1,P1} > P_{B3,P1} > P_{B2,P1}$, and $P_{B1,P2} > P_{B2,P2} > P_{B3,P2}$ would indicate a high similarity measure value, whereas the combination $P_{B1,P1} > P_{B2,P1} > P_{B3,P1}$, and $P_{B3,P2} > P_{B1,P2} > P_{B2,P2}$ would indicate a low similarity measure value.

As disclosed above, the receiving radio transceiver device 200 could, for example during a beam training procedure, sweep through each beam B1, B2, B3 for each polarization P1, P2. Hence, according to an embodiment the statistics of the received power $P_{B1,P1}$, $P_{B2,P1}$, $P_{B3,P1}$, $P_{B1,P2}$, $P_{B2,P2}$, $P_{B3,P2}$ is collected during at least one beam training procedure. In some scenarios, multiple beam training procedures may be needed in order for the receiving radio transceiver device 200 to collect enough statistics (such that the statistics have a variation (variance, or standard deviation) being smaller than a threshold variation value).

Reference is now made to FIG. 4 illustrating methods for polarization handling of received beam-formed signals 140 as performed by the receiving radio transceiver device 200 according to further embodiments. It is assumed that steps S102, S104, S106 are performed as described above with reference to FIG. 3 and a thus repeated description thereof is therefore omitted.

There may be different ways for the receiving radio transceiver device 200 to act if the similarity measure value is smaller than the similarity threshold value. According to some aspects the receiving radio transceiver device 200 keeps using rank two. Particularly, according to an embodiment the receiving radio transceiver device 200 is configured to perform step S108 when the similarity measure value is smaller than the similarity threshold value:

S108: The receiving radio transceiver device 200 continues to collect statistics of received power $P_{B1,P1}$, $P_{B2,P1}$, $P_{B3,P1}$, $P_{B1,P2}$, $P_{B2,P2}$, $P_{B3,P2}$ of the beam-formed signal 140 in the two orthogonal polarizations P1, P2.

Reference is now made to FIG. 5 illustrating a method for polarization handling of transmitted beam-formed signals 140 as performed by the transmitting radio transceiver device 300 according to an embodiment.

S202: The transmitting radio transceiver device 300 transmits a beam-formed signal 140 in two orthogonal polarizations P1, P2.

As disclosed above, the beam-formed signal 140 is received by the receiving radio transceiver device 200 that collects statistics of received power of the beam-formed signal 140 in the polarizations P1, P2. The receiving radio transceiver device 200 the signals to the transmitting radio transceiver device 300 as in step S106, when the similarity measure value is equal to, or larger than, the similarity threshold value, to use rank one for subsequent transmission of the beam-formed signal 140 to the receiving radio transceiver device 200. It is assumed that this signalling is received by the transmitting radio transceiver device 300. Hence, the transmitting radio transceiver device 300 is configured to perform step S204:

S204: The transmitting radio transceiver device 300 receives signalling from the receiving radio transceiver device 200. The signalling indicates for the transmitting radio transceiver device to use rank one for subsequent transmission of the beam-formed signal 140 to the receiving radio transceiver device 200.

Embodiments relating to further details of polarization handling of transmitted beam-formed signals 140 as performed by the transmitting radio transceiver device 300 will now be disclosed.

As disclosed above, according to an embodiment, when the signalling indicates for the transmitting radio transceiver device 300 to use rank one, the transmitting radio transceiver device 300 is indicated to only use one of the two orthogonal polarizations P1, P2 for the subsequent transmission of the beam-formed signal 140 to the receiving radio transceiver device 200.

As disclosed above, in some embodiments the beam-formed signal 140 is for each of the two orthogonal polarizations P1, P2 transmitted in at least two beams B1, B2, B3.

As disclosed above, in some embodiments the beam-formed signal 140 is transmitted during a beam training procedure.

Reference is now made to FIG. 6 illustrating methods for polarization handling of transmitted beam-formed signals 140 as performed by the transmitting radio transceiver device 300 according to further embodiments. It is assumed that steps S202, S204 are performed as described above with reference to FIG. 5 and a thus repeated description thereof is therefore omitted.

There may be different ways for the transmitting radio transceiver device 300 to act once having been signalled to use rank one for subsequent transmission of the beam-formed signal 140 to the receiving radio transceiver device 200. In some aspects the transmitting radio transceiver device 300 uses rank one at least temporarily before going back to using rank two. Particularly, according to an embodiment the transmitting radio transceiver device 300 is configured to perform step S206:

S206: The transmitting radio transceiver device 300 transmits the beam-formed signal 140 in only one of the two orthogonal polarizations P1, P2 during a time period before returning to transmitting the beam-formed signal 140 in both the two orthogonal polarizations P1, P2.

That is, according to this embodiment the transmitting radio transceiver device 300 changes from rank two beam sweeping to rank one beam sweeping for a predefined period of time, and then goes automatically back to rank-two again.

Embodiments applicable to both the methods performed by the receiving radio transceiver device 200 and the transmitting radio transceiver device 300 will now be disclosed.

There could be different examples of beam-formed signals 140. In some aspects the beam-formed signal 140 is a reference signal. Particularly, according to an embodiment the beam-formed signal 140 is a downlink reference signal and according to another embodiment the beam-formed signal 140 is an uplink reference signal. In general terms, the particular type of reference signal would depend on the type of transmitting radio transceiver device 300 and receiving radio transceiver device 200. For example, where the transmitting radio transceiver device 300 acts as, is implemented in, or is implemented to perform the functionality of, an access node and the receiving radio transceiver device 200 acts as, is implemented in, or is implemented to perform the functionality of, a wireless device the beam-formed signal 140 is a downlink reference signal. The downlink reference signal could be a beam reference signal for rank two beam sweeping, or channel state information reference signals used for closed loop polarization precoding. For example, where the transmitting radio transceiver device 300 acts as, is implemented in, or is implemented to perform the functionality of, a wireless device and the receiving radio transceiver device 200 acts as, is implemented in, or is implemented to perform the functionality of, an access node the beam-formed signal 140 is an uplink reference signal. The uplink reference signal could be a sounding reference signal.

A first particular embodiment for polarization handling of received beam-formed signals 140 as performed by the receiving radio transceiver device 200 based on at least some of the above disclosed embodiments will now be disclosed in detail.

This is a typical scenario where the receiving radio transceiver device 200 is implemented in a user device, such as in a wireless device.

S301: The receiving radio transceiver device 200 collects statistics of received power of a beam-formed signal 140 for both transmitted polarizations P1, P2 for different beams B1, B2, B3. One way to implement step S301 is to perform step S102.

S302: The receiving radio transceiver device 200 evaluates the correlation between the two polarizations P1, P2 of the beam-formed signal 140 based on the statistics. When enough statistics has been collected, the receiving radio transceiver device 200 evaluates, based on the statistics, if the correlation of the received signal power between the two transmit polarizations P1, P2 are stronger than a given threshold. One way to implement step S302 is to perform step S104.

S303: The receiving radio transceiver device 200 checks if the correlation is stronger than a predefined threshold value. If yes, step S304 is entered, and if no, step S305 is entered. One way to implement step S303 is to perform step S104.

S304: The receiving radio transceiver device 200 signals to the transmitting radio transceiver device 300 to switch to rank one beam sweeping (i.e., to transmit the beam-formed signal 140 in only one of the polarizations P1, P2). One way to implement step S304 is to perform step S106.

S305: The receiving radio transceiver device 200 signals to the transmitting radio transceiver device 300 to keep rank two beam sweeping (i.e., to transmit the beam-formed signal 140 in both the polarizations P1, P2).

A second particular embodiment for polarization handling of received beam-formed signals 140 as performed by the receiving radio transceiver device 200 based on at least some of the above disclosed embodiments will now be disclosed in detail. This is a typical scenario where the receiving radio transceiver device 200 is implanted in an access node.

S401: The receiving radio transceiver device 200 collects statistics of received power of a beam-formed signal 140 for both transmitted polarizations P1, P2 for different beams B1, B2, B3. One way to implement step S401 is to perform step S102.

S402: The receiving radio transceiver device 200 evaluates the correlation between the two polarizations P1, P2 of the beam-formed signal 140 based on the statistics. One way to implement step S402 is to perform step S104.

S403: The receiving radio transceiver device 200 checks if the correlation is stronger than a predefined threshold value. If yes, step S404 is entered, and if no, step S405 is entered. One way to implement step S403 is to perform step S104.

S404: The receiving radio transceiver device 200 causes the transmitting radio transceiver device 300 to switch to rank one beam sweeping (i.e., to transmit the beam-formed signal 140 in only one of the polarizations P1, P2). One way to implement step S404 is to perform step S106

S405: The receiving radio transceiver device 200 keeps using rank two beam sweeping (receiving the beam-formed signal 140 in both the polarizations P1, P2). One way to implement step S405 is to perform step S108.

Figure 9:
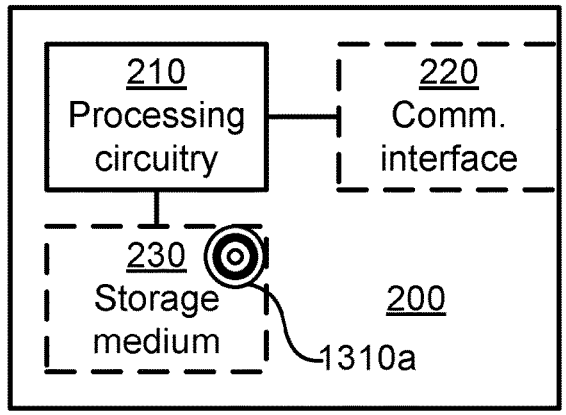
FIG. 9 is a schematic diagram showing functional units of a radio transceiver device acting as a receiving radio transceiver device according to an embodiment.

FIG. 9 schematically illustrates, in terms of a number of functional units, the components of a radio transceiver device acting as a receiving radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1310a (as in FIG. 13), e.g. in the form of a storage medium 230. The processing circuitry 210 may further be provided as at least one application specific integrated circuit (ASIC), or field programmable gate array (FPGA).

Particularly, the processing circuitry 210 is configured to cause the receiving radio transceiver device 200 to perform a set of operations, or steps, S102-S108, S301-S305, S401-S405, as disclosed above. For example, the storage medium 230 may store the set of operations, and the processing circuitry 210 may be configured to retrieve the set of operations from the storage medium 230 to cause the receiving radio transceiver device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The receiving radio transceiver device 200 may further comprise a communications interface 220 for communications with other entities, devices, and nodes of the communications system 100. As such the communications interface 220 may comprise one or more transmitters and receivers, comprising analogue and digital components.

The processing circuitry 210 controls the general operation of the receiving radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of the receiving radio transceiver device 200 are omitted in order not to obscure the concepts presented herein.

Figure 10:
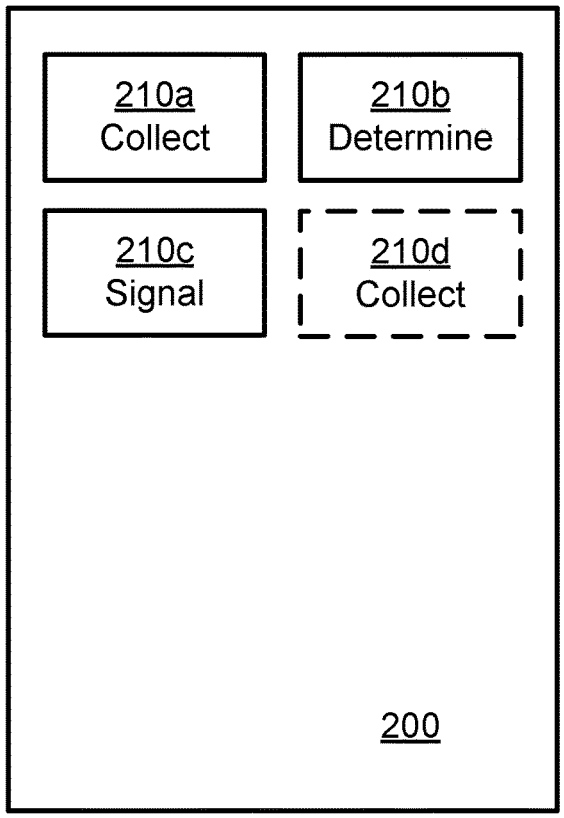
FIG. 10 is a schematic diagram showing functional modules of a radio transceiver device acting as a receiving radio transceiver device according to an embodiment.

FIG. 10 schematically illustrates, in terms of a number of functional modules, the components of a radio transceiver device acting as a receiving radio transceiver device 200 according to an embodiment. The receiving radio transceiver device 200 of FIG. 10 comprises a number of functional modules; a collect module 210a configured to perform step S102, a determine module 210b configured to perform step S104, and a signal module 210c configured to perform step S106. The receiving radio transceiver device 200 of FIG. 10 may further comprise a number of optional functional modules, such as a collect module 210d configured to perform step S108. In general terms, each functional module 210a-210d may be implemented in hardware or in software. Preferably, one or more or all functional modules 210a-210d may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210d and to execute these instructions, thereby performing any steps of the receiving radio transceiver device 200 as disclosed herein.

Figure 11:
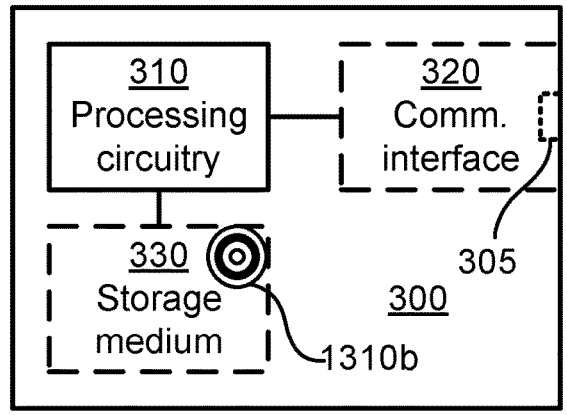
FIG. 11 is a schematic diagram showing functional units of a radio transceiver device acting as a transmitting radio transceiver device according to an embodiment.

FIG. 11 schematically illustrates, in terms of a number of functional units, the components of a radio transceiver device acting as a transmitting radio transceiver device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1310b (as in FIG. 13), e.g. in the form of a storage medium 330. The processing circuitry 310 may further be provided as at least one application specific integrated circuit (ASIC), or field programmable gate array (FPGA).

Particularly, the processing circuitry 310 is configured to cause the transmitting radio transceiver device 300 to perform a set of operations, or steps, S202-S206, as disclosed above. For example, the storage medium 330 may store the set of operations, and the processing circuitry 310 may be configured to retrieve the set of operations from the storage medium 330 to cause the transmitting radio transceiver device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The transmitting radio transceiver device 300 may further comprise a communications interface 320 for communications with other entities, devices, and nodes of the communications system 100. As such the communications interface 320 may comprise one or more transmitters and receivers, comprising analogue and digital components. For example, the communications interface 320 may comprise, or be operatively connected to, at least one TRP 305.

The processing circuitry 310 controls the general operation of the transmitting radio transceiver device 300 e.g. by sending data and control signals to the communications interface 320 and the storage medium 330, by receiving data and reports from the communications interface 320, and by retrieving data and instructions from the storage medium 330. Other components, as well as the related functionality, of the transmitting radio transceiver device 300 are omitted in order not to obscure the concepts presented herein.

Figure 12:
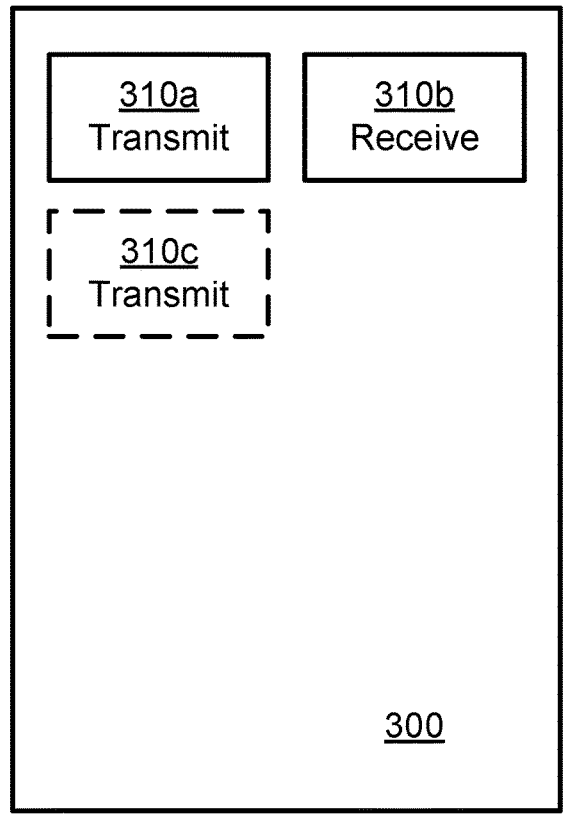
FIG. 12 is a schematic diagram showing functional modules of a radio transceiver device acting as a transmitting radio transceiver device according to an embodiment.

FIG. 12 schematically illustrates, in terms of a number of functional modules, the components of a radio transceiver device acting as a transmitting radio transceiver device 300 according to an embodiment. The transmitting radio transceiver device 300 of FIG. 12 comprises a number of functional modules; a transmit module 301a configured to perform step S202 and a receive module 310b configured to perform step S204. The transmitting radio transceiver device 300 of FIG. 12 may further comprise a number of optional functional modules, such as a transmit module 310c configured to perform step S206. In general terms, each functional module 310a-310d may be implemented in hardware or in software. Preferably, one or more or all functional modules 310a-310d may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310d and to execute these instructions, thereby performing any steps of the transmitting radio transceiver device 300 as disclosed herein.

The receiving radio transceiver device 200 and/or the transmitting radio transceiver device 300 may be provided as a standalone device or as a part of at least one further device. For example, the receiving radio transceiver device 200 or the transmitting radio transceiver device 300 may be provided in a node of the radio access network or in a node of the core network whereas the other of the receiving radio transceiver device 200 or the transmitting radio transceiver device 300 may be provided in a wireless device. Alternatively, functionality of the receiving radio transceiver device 200 and/or the transmitting radio transceiver device 300 may be distributed between at least two devices, or nodes. These at least two nodes, or devices, may either be part of the same network part or may be spread between at least two such network parts.

Thus, a first portion of the instructions performed by the receiving radio transceiver device 200 and/or transmitting radio transceiver device 300 may be executed in respective first devices, and a second portion of the of the instructions performed by the receiving radio transceiver device 200 and/or transmitting radio transceiver device 300 may be executed in respective second devices; the herein disclosed embodiments are not limited to any particular number of devices on which the instructions performed by the receiving radio transceiver device 200/transmitting radio transceiver device 300 may be executed. Hence, the methods according to the herein disclosed embodiments are suitable to be performed by a receiving radio transceiver device 200/transmitting radio transceiver device 300 residing in a cloud computational environment. Therefore, although a single processing circuitry 210, 310 is illustrated in FIGS. 9 and 11 the processing circuitry 210, 310 may be distributed among a plurality of devices, or nodes. The same applies to the functional modules 210a-210d, 310a-310d of FIGS. 10 and 12 and the computer programs 1320a, 1320b of FIG. 13 (see below).

Figure 13:
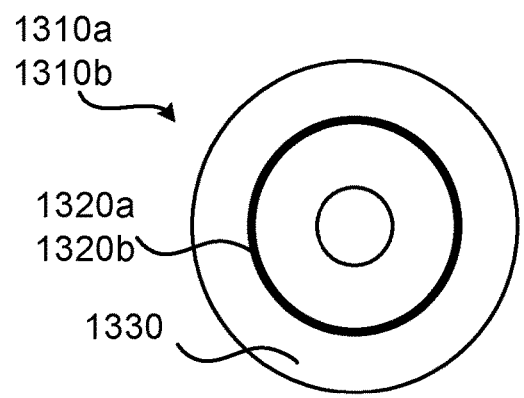
FIG. 13 shows one example of a computer program product comprising computer readable means according to an embodiment.
Figure 7:
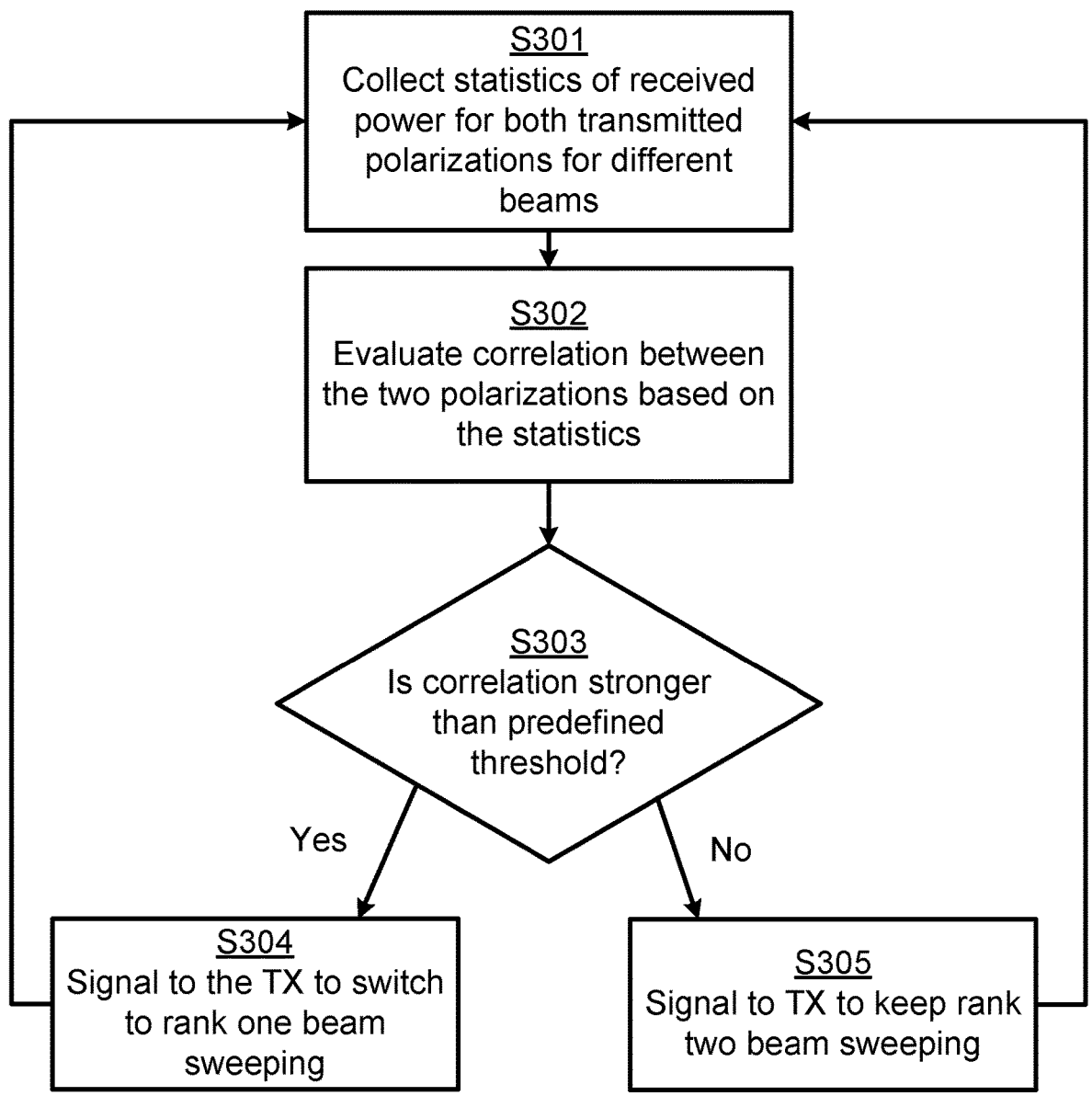
Figure 8:
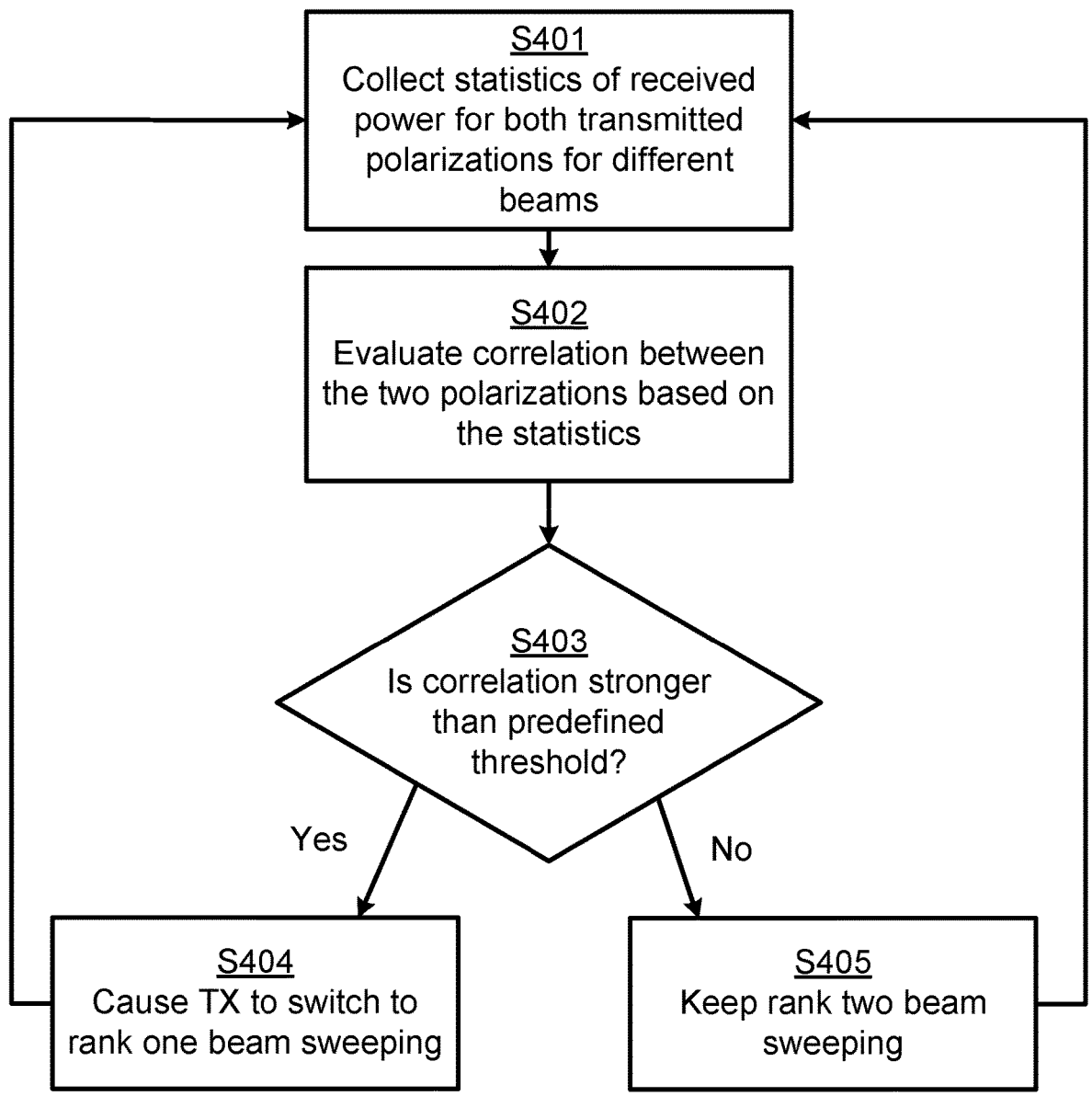

FIG. 13 shows one example of a computer program product 1310a, 1310b comprising computer readable means 1330. On this computer readable means 1330, a computer program 1320a can be stored, which computer program 1320a can cause the processing circuitry 210 and thereto operatively coupled entities and devices, such as the communications interface 220 and the storage medium 230, to execute methods according to embodiments described herein. The computer program 1320a and/or computer program product 1310a may thus provide means for performing any steps of the receiving radio transceiver device 200 as herein disclosed. On this computer readable means 1330, a computer program 1320b can be stored, which computer program 1320b can cause the processing circuitry 310 and thereto operatively coupled entities and devices, such as the communications interface 320 and the storage medium 330, to execute methods according to embodiments described herein. The computer program 1320b and/or computer program product 1310b may thus provide means for performing any steps of the transmitting radio transceiver device 300 as herein disclosed.

In the example of FIG. 13, the computer program product 1310a, 1310b is illustrated as an optical disc, such as a CD (compact disc) or a DVD (digital versatile disc) or a Blu-Ray disc. The computer program product 1310a, 1310b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320a, 1320b is here schematically shown as a track on the depicted optical disk, the computer program 1320a, 1320b can be stored in any way which is suitable for the computer program product 1310a, 1310b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for polarization handling of received beam-formed signals, the method being performed by a receiving radio transceiver device, the method comprising:
collecting statistics of received power of a beam-formed signal transmitted in two orthogonal polarizations from a transmitting radio transceiver device;
determining a similarity measure value of the beam-formed signal between the two orthogonal polarizations using the collected statistics;
determining whether the similarity measure value is not less than a similarity threshold value; and
as a result of determining that the similarity measure value is not less than the similarity threshold value, signaling to the transmitting radio transceiver device to use rank one for subsequent transmission of the beam-formed signal to the receiving radio transceiver device, wherein
when signaled to use rank one, the transmitting radio transceiver device is signaled to only use one of the two orthogonal polarizations for the subsequent transmission of the beam-formed signal to the receiving radio transceiver device.

2. The method of claim 1, further comprising, when the similarity measure value is smaller than the similarity threshold value:
continuing collecting statistics of received power of the beam-formed signal in the two orthogonal polarizations.

3. The method of claim 1, wherein the similarity measure value is determined based on a correlation between the beam-formed signal in a first of the two orthogonal polarizations and the beam-formed signal in a second of the two orthogonal polarizations.

4. The method of claim 1, wherein the beam-formed signal for each of the two orthogonal polarizations is received in at least two beams.

5. The method of claim 4, wherein the similarity measure value is determined based on an ordering of the at least two beams according to received power in each of the at least two beams for each of the two orthogonal polarizations.

6. The method of claim 4, wherein the similarity measure value is determined based on in which of the at least two beams the received power is strongest for the two orthogonal polarizations.

7. The method of claim 1, wherein the statistics of the received power is collected during at least one beam training procedure.

8. A method being performed by a transmitting radio transceiver device, the method comprising:
transmitting a beam-formed signal in two orthogonal polarizations, wherein transmitting the beam-formed signal in two orthogonal polarizations comprises transmitting the beam-formed signal in a first polarization and transmitting the beam-formed signal in a second polarization, and the first polarization is orthogonal to the second polarization; and
receiving signaling from a receiving radio transceiver device, the signaling indicating whether or not to use rank one for subsequent transmission of the beam-formed signal to the receiving radio transceiver device, wherein
when the signaling indicates to use rank one, the transmitting radio transceiver device uses only one of the two orthogonal polarizations for the subsequent transmission of the beam-formed signal to the receiving radio transceiver device, and
when the signaling indicates to use a rank other than rank one, the transmitting radio transceiver device uses both orthogonal polarizations for the subsequent transmission of the beam-formed signal to the receiving radio transceiver device.

9. The method of claim 8, further comprising:
transmitting the beam-formed signal in only one of the two orthogonal polarizations during a time period before returning to transmitting the beam-formed signal in both the two orthogonal polarizations.

10. The method of claim 8, wherein the beam-formed signal for each of the two orthogonal polarizations is transmitted in at least two beams.

11. The method of claim 8, wherein the beam-formed signal is transmitted during a beam training procedure.

12. The method of claim 8, wherein the beam-formed signal is a downlink reference signal or an uplink reference signal.

13. The method of claim 8, wherein the indication for the transmitting radio transceiver device to use rank one for the subsequent transmission of the beam-formed signal is determined based on a similarity measure value of the beam-formed signal between the two orthogonal polarizations.

14. A radio transceiver device acting as a receiving radio transceiver device for polarization handling of received beam-formed signals, the radio transceiver device comprising processing circuitry, the processing circuitry being configured to cause the radio transceiver device to:
collect statistics of received power of a beam-formed signal transmitted in two orthogonal polarizations from a transmitting radio transceiver device;
determine a similarity measure value of the beam-formed signal between the two orthogonal polarizations using the collected statistics; and
signal to the transmitting radio transceiver device, when the similarity measure value is equal to, or larger than, a similarity threshold value, to use rank one for subsequent transmission of the beam-formed signal to the receiving radio transceiver device, wherein
when signaled to use rank one, the transmitting radio transceiver device is signaled to only use one of the two orthogonal polarizations for the subsequent transmission of the beam-formed signal to the receiving radio transceiver device.

15. A radio transceiver device acting as a transmitting radio transceiver device, the radio transceiver device comprising processing circuitry, the processing circuitry being configured to cause the radio transceiver device to:

transmit a beam-formed signal in two orthogonal polarizations, wherein transmitting the beam-formed signal in two orthogonal polarizations comprises transmitting the beam-formed signal in a first polarization and transmitting the beam-formed signal in a second polarization, and the first polarization is orthogonal to the second polarization; and receive signaling from a receiving radio transceiver device, the signaling indicating whether or not to use rank one for subsequent transmission of the beam-formed signal to the receiving radio transceiver device, wherein when the signaling indicates to use rank one, the transmitting radio transceiver device uses only one of the two orthogonal polarizations for the subsequent transmission of the beam-formed signal to the receiving radio transceiver device, and when the signaling indicates to use a rank other than rank one, the transmitting radio transceiver device uses both orthogonal polarizations for the subsequent transmission of the beam-formed signal to the receiving radio transceiver device.

16. A computer program product comprising a non-transitory computer readable medium comprising a computer program for polarization handling of received beam-formed signals, the computer program comprising computer code which, when run on processing circuitry of a radio transceiver device acting as a receiving radio transceiver device, causes the radio transceiver device to:

collect statistics of received power of a beam-formed signal transmitted in two orthogonal polarizations from a transmitting radio transceiver device;

determine a similarity measure value of the beam-formed signal between the two orthogonal polarizations using the collected statistics; and signal to the transmitting radio transceiver device, when the similarity measure value is equal to, or larger than, a similarity threshold value, to use rank one for subsequent transmission of the beam-formed signal to the receiving radio transceiver device, wherein when signaled to use rank one, the transmitting radio transceiver device is signaled to only use one of the two orthogonal polarizations for the subsequent transmission of the beam-formed signal to the receiving radio transceiver device.

17. A computer program product comprising a non-transitory computer readable medium comprising a computer program, the computer program comprising computer code which, when run on processing circuitry of a radio transceiver device acting as a transmitting radio transceiver device, causes the radio transceiver device to:

transmit a beam-formed signal in two orthogonal polarizations, wherein transmitting the beam-formed signal in two orthogonal polarizations comprises transmitting the beam-formed signal in a first polarization and transmitting the beam-formed signal in a second polarization, and the first polarization is orthogonal to the second polarization; and receive signaling from a receiving radio transceiver device, the signaling indicating whether or not to use rank one for subsequent transmission of the beam-formed signal to the receiving radio transceiver device, wherein when the signaling indicates to use rank one, the transmitting radio transceiver device uses only one of the two orthogonal polarizations for the subsequent transmission of the beam-formed signal to the receiving radio transceiver device, and when the signaling indicates to use a rank other than rank one, the transmitting radio transceiver device uses both orthogonal polarizations for the subsequent transmission of the beam-formed signal to the receiving radio transceiver device.

* * * * *